(12) United States Patent
Ogura et al.

(10) Patent No.: US 10,330,976 B2
(45) Date of Patent: Jun. 25, 2019

(54) LIQUID CRYSTAL BACKLIGHT DEVICE

(71) Applicant: PANASONIC INTELLECTUAL PROPERTY MANAGEMENT CO., LTD., Osaka (JP)

(72) Inventors: Motonari Ogura, Osaka (JP); Taku Yamada, Kyoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 15/802,323

(22) Filed: Nov. 2, 2017

(65) Prior Publication Data

US 2018/0059479 A1 Mar. 1, 2018

Related U.S. Application Data

(63) Continuation of application No. PCT/JP2016/003848, filed on Aug. 24, 2016.

(30) Foreign Application Priority Data

Mar. 10, 2016 (JP) .................................. 2016-047401

(51) Int. Cl.
*G02F 1/1333* (2006.01)
*G02F 1/1335* (2006.01)
*F21V 8/00* (2006.01)

(52) U.S. Cl.
CPC ....... *G02F 1/133602* (2013.01); *G02B 6/005* (2013.01); *G02F 1/133308* (2013.01);
(Continued)

(58) Field of Classification Search
CPC ............. G02F 1/133308; G02F 1/1335; G02F 1/133524; G02F 1/133608;
(Continued)

(56) References Cited

U.S. PATENT DOCUMENTS 5,659,376 A 8/1997 Uehara et al.
2004/0189889 A1 9/2004 Nitto et al.
(Continued)

FOREIGN PATENT DOCUMENTS

JP H07-168177 A 7/1995
JP 2005-062777 A 3/2005
(Continued)

OTHER PUBLICATIONS

International Search Report and Written Opinion issued in International Patent Application No. PCT/JP2016/003848 dated Nov. 1, 2016; with partial English translation.
(Continued)

*Primary Examiner* — Thoi V Duong
(74) *Attorney, Agent, or Firm* — McDermott Will & Emery LLP

(57) ABSTRACT

A liquid crystal backlight device includes: a frame that includes a first frame and a second frame defining a space; a liquid crystal panel that covers an opening of the first frame; a backlight unit that irradiates the liquid crystal panel with light; an optical sheet; a cushion member that is located between the liquid crystal panel and the first frame, and surrounds the opening without any gap; a plurality of cushion members that are located between the first frame and the optical sheet, surround the opening, and are arranged at a predetermined spacing from each other; and a seal material that seals a hole which is formed through a lateral part of the frame as seen from the front and through which the space and an outside of the liquid crystal backlight device communicate with each other.

7 Claims, 9 Drawing Sheets

(52) U.S. Cl.
CPC ............... *G02F 1/133524* (2013.01); *G02F 2001/133311* (2013.01); *G02F 2201/36* (2013.01); *G02F 2202/28* (2013.01)

(58) Field of Classification Search
CPC ......... G02F 1/133615; G02F 1/133603; G02F 1/1333; G02F 1/1336; G02F 1/1339; G02F 1/13338; G02F 1/133602; G02F 1/133605; G02F 1/133606; G02F 1/133504; G02F 1/133553; G02F 2001/133317; G02F 2001/133314; G02F 2001/133322; G02F 2001/133331; G02F 2001/13332; G02F 2001/133311; G02F 2001/133325; G02F 2001/133553; G02F 2201/503; G02F 2201/46; G02F 2201/50; G02B 6/0088; G02B 6/0091; G02B 6/0055; G02B 6/0073; G02B 6/00; G02B 6/0081; G02B 6/0086; G02B 7/00
See application file for complete search history.

(56) References Cited

U.S. PATENT DOCUMENTS

| | | | |
|---|---|---|---|
| 2010/0073582 A1* | 3/2010 | Konno | G02F 1/133308 348/794 |
| 2010/0214505 A1 | 8/2010 | Kim et al. | |
| 2013/0154953 A1 | 6/2013 | Lai et al. | |
| 2017/0139102 A1* | 5/2017 | Fu | G02B 6/009 |

FOREIGN PATENT DOCUMENTS

| | | |
|---|---|---|
| JP | 2005-108769 A | 4/2005 |
| JP | 2007-059181 A | 3/2007 |
| JP | 2014-130290 A | 7/2014 |

OTHER PUBLICATIONS

Extended European Search Report dated Dec. 13, 2018 for the corresponding European patent application No.16893381.0.

* cited by examiner

LIQUID CRYSTAL BACKLIGHT DEVICE

CROSS REFERENCE TO RELATED APPLICATIONS

This application is a U.S. continuation application of PCT International Patent Application Number PCT/JP2016/003848 filed on Aug. 24, 2016, claiming the benefit of priority of Japanese Patent Application Number 2016-047401 filed on Mar. 10, 2016, the entire contents of which are hereby incorporated by reference.

BACKGROUND

1. Technical Field

The present disclosure relates to a liquid crystal backlight device used in a liquid crystal display device such as a liquid crystal television or a liquid crystal monitor device.

2. Description of the Related Art

Touch panel-equipped liquid crystal display devices including both a touch panel (touchscreen) and a liquid crystal module are known for use in mobile terminals such as mobile phones, e.g. smartphones, and tablet terminals nowadays (for example, see Japanese Unexamined Patent Application Publication No. 2014-130290 (Patent Literature (PTL) 1)). The technique in PTL 1 uses direct bonding to bond a touch panel and a liquid crystal module.

SUMMARY

With the technique in PTL 1, however, accurately bonding a touch panel and a liquid crystal module by direct bonding is difficult. The same applies to bonding a cover glass and a liquid crystal module by direct bonding.

The present disclosure provides a liquid crystal backlight device that can be accurately bonded to a touch panel or a cover glass easily even in the case of using direct bonding.

A liquid crystal backlight device according to one aspect of the present disclosure includes: a frame that includes a first frame having an opening and a second frame defining a space with the first frame; a liquid crystal panel that is located on a side of the first frame opposite to the second frame, and covers the opening; a backlight unit that is located in the space, and irradiates the liquid crystal panel with light; an optical sheet that is located between the first frame and the backlight unit; a first elastic member that is located between the liquid crystal panel and the first frame, and surrounds the opening of the first frame without any gap; a plurality of second elastic members that are located between the first frame and the optical sheet, surround the opening of the first frame, and are arranged at a predetermined spacing from each other; and a seal material that seals a hole which is formed through a lateral part of the frame as seen in an arrangement direction of the first frame and the second frame and through which the space and an outside of the liquid crystal backlight device communicate with each other.

A liquid crystal backlight device according to another aspect of the present disclosure includes: a frame that includes a first frame having an opening and a second frame defining a space with the first frame; a liquid crystal panel that is located on a side of the first frame opposite to the second frame, and covers the opening; a backlight unit that is located in the space, and irradiates the liquid crystal panel with light; an optical sheet that is located between the first frame and the backlight unit; a first elastic member that is located between the liquid crystal panel and the first frame, and surrounds the opening of the first frame without any gap; a plurality of second elastic members that are located between the first frame and the optical sheet, surround the opening of the first frame, and are arranged at a predetermined spacing from each other; and a seal material that seals a first hole and a second hole, the first hole being a hole which is formed through a lateral part of the first frame as seen in an arrangement direction of the first frame and the second frame and through which a first space between the liquid crystal panel and the optical sheet and a space outside the liquid crystal backlight device communicate with each other, and the second hole being a hole which is formed through a lateral part of the backlight unit and the second frame as seen in the arrangement direction and through which a second space between the backlight unit and the optical sheet and the outside space communicate with each other.

According to these aspects of the present disclosure, a liquid crystal backlight device can be accurately bonded to a touch panel or a cover glass easily even in the case of using direct bonding.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

Figure 1:
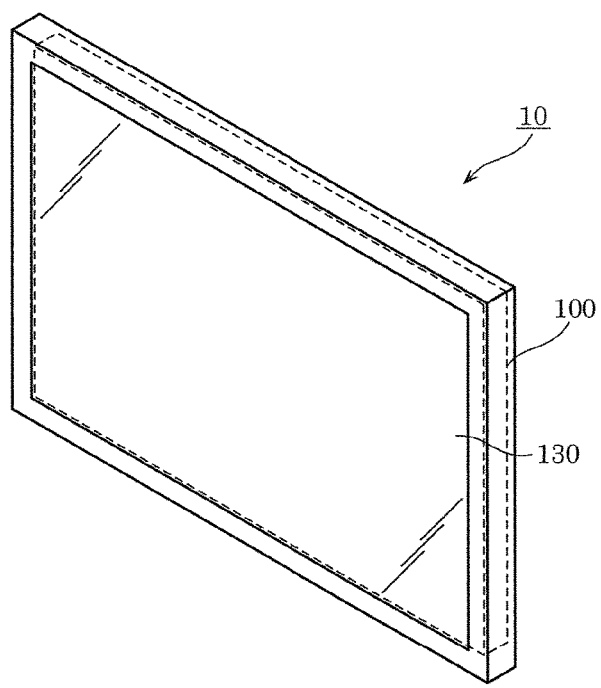
FIG. 1 is an external perspective view of a liquid crystal display device according to Embodiment 1.

DETAILED DESCRIPTION OF THE EMBODIMENTS (Underlying Knowledge Forming Basis of the Present Disclosure)

In relation to the conventional touch panel-equipped liquid crystal display device described in the Background Art section, the inventors have found the following.

The conventional structure is as follows: A touch panel and a liquid crystal module are separate components, and the liquid crystal module is attached to the inside of a casing and the touch panel is mounted on the front of the casing as part of the exterior. Thus, in the conventional structure, an air layer typically exists between the touch panel and the liquid crystal module.

Nowadays, however, the technique (hereafter "direct bonding") of directly bonding the touch panel and the liquid crystal module has been established mainly for small displays, and several products have already been introduced commercially. Direct bonding is expected to provide various advantages such as reflection prevention, luminance improvement, strength improvement, condensation prevention, and dust entry prevention.

Meanwhile, direct bonding also has disadvantages. For example, if the selected adhesive is not appropriate, in the manufactured product, the adhesive layer peels and becomes visible in the view area, or stress acts on the liquid crystal module due to expansion/contraction of the adhesive and causes the liquid crystals to gradually change color to yellow.

Disadvantages are also seen in the manufacturing process. For example, upon direct bonding, a possible misalignment between the touch panel and the liquid crystal module to be bonded causes the display to tilt with respect to the normal position. Besides, in the event of a bonding failure, even when the operator tries to tear the touch panel and the liquid crystal module from each other and rework them, peeling the touch panel and the liquid crystal module from each other is hard depending on the type of the adhesive, and the touch panel or the liquid crystal module can be damaged. This leads to more defects in the manufacturing process.

In view of this, various methods have conventionally been proposed to bond the touch panel and the liquid crystal module. Examples include a method of bonding by applying pressure with rollers in an atmospheric environment, and a method of bonding while removing air in a vacuum environment. In particular, the latter method of bonding in a vacuum environment is advantageous in that air bubbles are kept from entering and, even if air bubbles enter, they disappear easily in subsequent processes. This method is accordingly employed by many manufacturers nowadays.

The present disclosure relates to the technique of bonding in a vacuum environment from among the bonding techniques for direct bonding.

The following describes a problem in bonding in a vacuum environment.

In the case of bonding the touch panel and the liquid crystal module, there are typically two possible combinations of components to be bonded. One method is to directly bond the touch panel and the liquid crystal module to each other. The other method is to, before assembling the liquid crystal module, take out the part of the liquid crystal cell to be incorporated in the liquid crystal module, bond the touch panel and the liquid crystal cell, and assemble the other components (e.g. backlight, etc.) of the liquid crystal module after the bonding.

The former method is easy in the case where the company does not assemble the liquid crystal module. The latter method requires assembling the backlight, and so the backlight assembling step needs to be taken into account to perform this method. Hence, many manufacturers that perform bonding mainly employ the former method.

However, bonding the combination of the touch panel and the liquid crystal module in a vacuum environment has the following significant problem. The liquid crystal module usually has a structure in which its exterior is structurally completely sealed to prevent the entry of dust into the inside. Thus, the liquid crystal module does not have any hole or the like through to the inside of the liquid crystal module, except in special cases. If the liquid crystal module has such a hole, dust easily enters into the liquid crystal module from the hole. Once dust has entered into the liquid crystal module, such dust is shown on the display, and also it is difficult to remove the dust. This causes a serious defect of the product.

It is therefore assumed that the liquid crystal module is structurally sealed to prevent the entry of dust. In such a case, bonding in a vacuum environment is very difficult. In detail, in the process of bonding in a vacuum environment, both the touch panel and the liquid crystal module are placed in a vacuum chamber, and bonded after increasing the degree of vacuum by decompressing the inside of the vacuum chamber. During this process of decompressing the inside of the vacuum chamber, an air pressure difference occurs between the inside of the liquid crystal module and the outside of the liquid crystal module (i.e. the inside of the vacuum chamber), causing the liquid crystal module to swell (see FIG. 5 described later). When trying to place the touch panel on such a swollen liquid crystal module, the liquid crystal module and the touch panel are hard to be brought into surface contact with each other. The liquid crystal module and the touch panel are thus misaligned from their position for bonding.

Typically, after setting the work, the liquid crystal module and the touch panel are aligned, and then the vacuum bonding process is carried out. In other words, the aforementioned misalignment of the liquid crystal module and the touch panel occurs after the alignment, which presents a serious defect in the operation. The vacuum chamber is typically decompressed rapidly to about 100 Pa within several seconds to several tens of seconds. Such rapid decompression induces the air pressure difference between the inside and outside of the liquid crystal module. Here, even though the liquid crystal module is supposed to be structurally sealed, the liquid crystal module is assembled from components and so there are narrow gaps between components. In the vacuum environment, a slight amount of air enters and leaves the liquid crystal module through these gaps. Accordingly, if the liquid crystal module is left in the vacuum environment for a long time (about several tens of minutes), the air pressure difference between the inside and outside of the liquid crystal module decreases gradually, and the swelling of the liquid crystal module diminishes. This, however, requires a retention time of several tens of minutes each time one set is bonded. Such a method is undesirable as mass productivity drops greatly and costs are affected significantly.

The present disclosure has been made to solve such a problem.

The following describes embodiments in detail, with reference to drawings as appropriate. In the following, description detailed more than necessary may be omitted. For example, detailed description of well-known matters or repeated description of the substantially same structures may be omitted. This is to avoid unnecessarily redundant description and facilitate the understanding of a person skilled in the art.

The accompanying drawings and the following description are provided to help a person skilled in the art to fully understand the present disclosure, and are not intended to limit the subject matter defined in the appended claims.

Embodiment 1

Embodiment 1 is described below, with reference to FIGS. 1 to 4.

FIG. 1 is an external perspective view of a liquid crystal display device according to this embodiment.

As illustrated in FIG. 1, liquid crystal display device 10 according to this embodiment includes: touch panel (touchscreen) 130 including a touch sensor; and liquid crystal backlight device 100 as a liquid crystal module. Liquid crystal display device 10 may include a cover glass instead of touch panel 130, or include a cover glass on top of touch panel 130. Touch panel 130 is located at the front of liquid crystal backlight device 100. Liquid crystal display device 10 is a smartphone, a tablet, a laptop PC, a desktop PC, any type of monitor device, or the like.

[1. Structure of Liquid Crystal Backlight Device]

Figure 2:
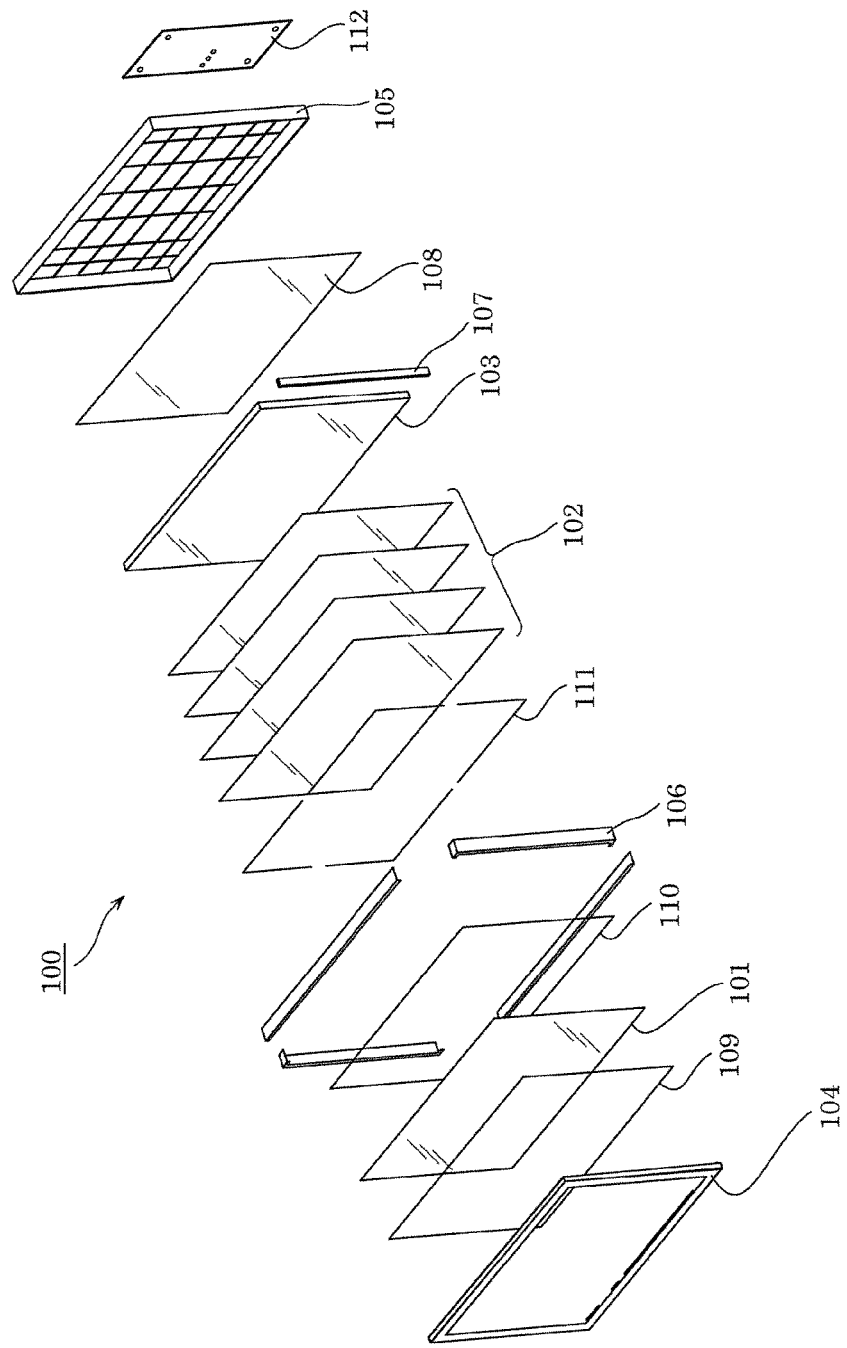
FIG. 2 is an exploded perspective view of a liquid crystal backlight device according to Embodiment 1.
Figure 3:
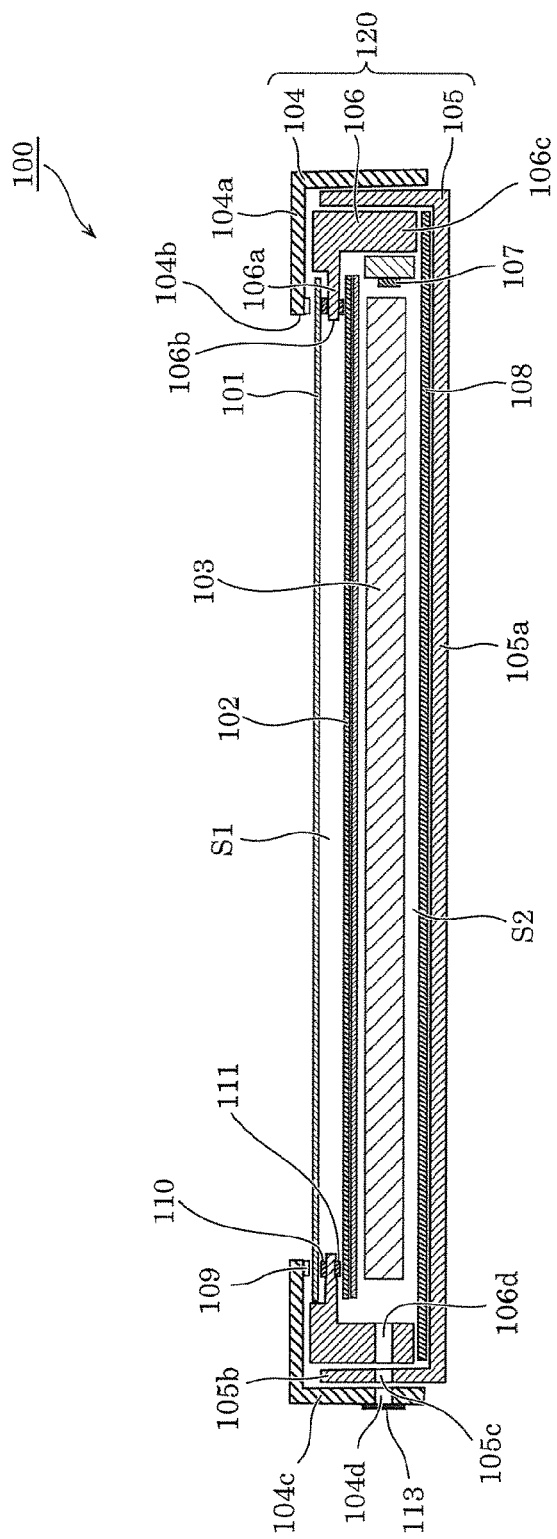
FIG. 3 is a sectional view of the liquid crystal backlight device according to Embodiment 1.

FIG. 2 is an exploded perspective view of the liquid crystal backlight device according to this embodiment. FIG. 3 is a sectional view of the liquid crystal backlight device according to this embodiment.

As illustrated in FIGS. 2 and 3, liquid crystal backlight device 100 includes liquid crystal panel 101, optical sheet 102, light guide plate 103, frame 120, light source 107, reflection sheet 108, and circuit board 112.

Frame 120 includes: first frame 106 having an opening; and second frame 105 defining a space with first frame 106. Frame 120 is a member that constitutes a casing of liquid crystal backlight device 100. Frame 120 is made of resin or metal.

First frame 106 is a member L-shaped in cross section and includes: front portion 106a located on the front and having opening 106b; and lateral wall portion 106c connected to the outer peripheral portion of front portion 106a and laterally surrounding light guide plate 103. Front portion 106a of first frame 106 supports the back of the outer peripheral portion of liquid crystal panel 101, and holds the front of the outer peripheral portion of optical sheet 102 and light guide plate 103. Hole 106d is formed through lateral wall portion 106c of first frame 106.

Second frame 105 includes: back portion 105a located at the back of light guide plate 103; and lateral wall portion 105b connected to the outer peripheral portion of back portion 105a and laterally covering light guide plate 103 and lateral wall portion 106c of first frame 106. Not only light guide plate 103 but also optical sheet 102, light source 107, and reflection sheet 108 are contained in the space defined by first frame 106 and second frame 105. Hole 105c is formed through lateral wall portion 105b of second frame 105.

Frame 120 may further include front frame 104 covering the front of first frame 106. Front frame 104 includes: front portion 104a located at the front of first frame 106 and having opening 104b; and lateral wall portion 104c laterally covering lateral wall portion 105b of second frame 105. Front portion 104a holds the outer peripheral portion of liquid crystal panel 101 from the front. Hole 104d is formed through lateral wall portion 104c of front frame 104. Front frame 104 may be made of resin or metal as with first frame 106 and second frame 105, or made of tape.

Hole 106d formed through lateral wall portion 106c of first frame 106, hole 105c formed through lateral wall portion 105b of second frame 105, and hole 104d formed through lateral wall portion 104c of front frame 104 overlap each other as seen laterally (seen in the direction in which lateral wall portion 106c, lateral wall portion 105b, and lateral wall portion 104c are arranged). In other words, a lateral part of frame 120 has a hole through which the space inside frame 120 and the outside space communicate with each other.

The side of frame 120 on which the hole (holes 104d, 105c, and 106d) is formed may be opposite to the side on which light source 107 is located. This keeps light source 107 from restricting airflow through the hole.

The hole (holes 104d, 105c, and 106d) may be larger than a gap between frame 120 and liquid crystal panel 101, i.e. a gap between the space inside frame 120 and the outside space. This allows the pressure difference between the space inside the liquid crystal backlight device and the outside space to be eliminated efficiently in the case of placing the liquid crystal backlight device in a vacuum environment.

Liquid crystal panel 101 is a display panel for video display in which a plurality of pixels are arranged in a matrix. Liquid crystal panel 101 is located at the front of first frame 106 (i.e. opposite to second frame 105), and covers the opening of first frame 106. Liquid crystal panel 101 displays video based on a video signal fed to a drive circuit (not illustrated).

Optical sheet 102 is a sheet located between first frame 106 and light guide plate 103 and having various optical functions. For example, optical sheet 102 includes a diffusion sheet that diffuses light to improve the uniformity of luminance, a prism sheet that arranges light in the front direction to improve the luminance perceived by the user, and the like. Optical sheet 102 may also include a microlens, a luminance improving sheet, a composite sheet, etc. Optical sheet 102 is, for example, made of molding resin having a fine shape corresponding to a function on its surface.

Light guide plate 103 is a member that guides light emitted from light source 107 located laterally, toward the front (i.e. toward liquid crystal panel 101 and optical sheet 102). For example, light guide plate 103 is made of polycarbonate (PC), polymethacrylstyrene (MS), methacrylic resin (polymethyl methacrylate (PMMA)), or the like.

Light source 107 includes: a long substrate; and a plurality of light emitting diodes (LEDs) arranged on the substrate in its longitudinal direction. In liquid crystal backlight device 100, light guide plate 103 and light source 107 constitute a backlight unit that is located in the space of frame 120 and irradiates liquid crystal panel 101 with light.

Cushion member 109 is an elastic member that is located between front frame 104 and liquid crystal panel 101 and protects the front surface of liquid crystal panel 101.

Circuit board 112 is located at the back of second frame 105. Circuit board 112 is a circuit board provided with, for example, a signal processing circuit for receiving and processing a video signal and a power circuit for supplying operating power to liquid crystal backlight device 100. Although there is one circuit board 112 in FIG. 2, circuit board 112 may be divided into a plurality of circuit boards depending on circuit type.

Figure 4:
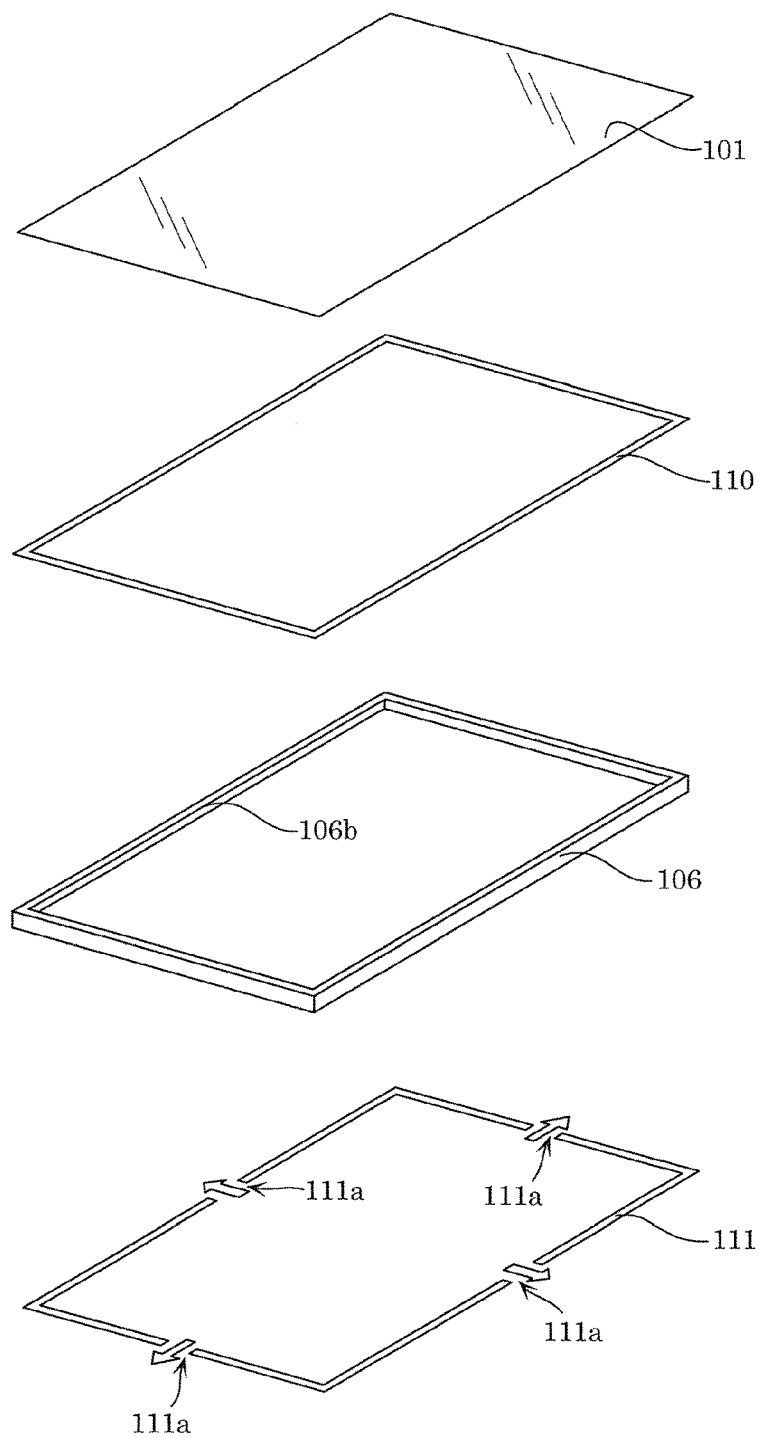
FIG. 4 is an exploded perspective view illustrating an example of the arrangement of cushion members.

As illustrated in FIG. 4, cushion member 110 is a first elastic member that is located between liquid crystal panel 101 and first frame 106 and surrounds opening 106b of first frame 106 without any gap. FIG. 4 is an exploded perspective view illustrating an example of the arrangement of cushion members. Cushion member 110 is a member that protects the back surface of liquid crystal panel 101.

Cushion member 111 includes a plurality of second elastic members that are located between first frame 106 and optical sheet 102, surround opening 106b of first frame 106, and are arranged at predetermined spacings from each other. Cushion member 111 is a member that protects the front surface of optical sheet 102.

Cushion members 109 to 111 are, for example, sponge-like members formed by causing resin to foam.

The front of opening 106b of first frame 106 is covered by liquid crystal panel 101 via cushion member 110. Since cushion member 110 surrounds the front of opening 106b without any gap, liquid crystal panel 101 seals the front of opening 106b.

The back of first frame 106 around the perimeter of opening 106b is held by the front of optical sheet 102 and light guide plate 103 via cushion member 111. Cushion member 111 includes a plurality of cushion members that surround opening 106b at the back of opening 106b and are arranged at predetermined spacings as openings 111a. In other words, a space through which first space S1 between liquid crystal panel 101 and optical sheet 102 and second space S2 in which light guide plate 103 is located communicate with each other is formed in the part of opening 111a of cushion member 111. Although the number of openings 111a is four in this embodiment, the number of openings 111a is not limited to four, and may be one, two, three, or five or more.

Seal material 113 seals the hole (holes 104d, 105c, and 106d) formed through the lateral part of frame 120. By removing seal material 113, the space inside frame 120 and the outside space can be easily brought into a communicating state.

Seal material 113 may block out light in the hole between the outside space and the space inside frame 120. This keeps light applied from the light source of liquid crystal backlight device 100 from leaking out of frame 120.

For example, seal material 113 may be made of adhesive tape. Such a seal material can be easily removed while preventing the entry of dust into the space inside frame 120, immediately before bonding in the vacuum environment.

Regarding details other than those described above, they do not particularly or closely relate to the present disclosure and so their description is omitted. Although the material examples and the like have been described above, the present disclosure is not limited to such.

[2. Vacuum Bonding Process]

Figure 5:
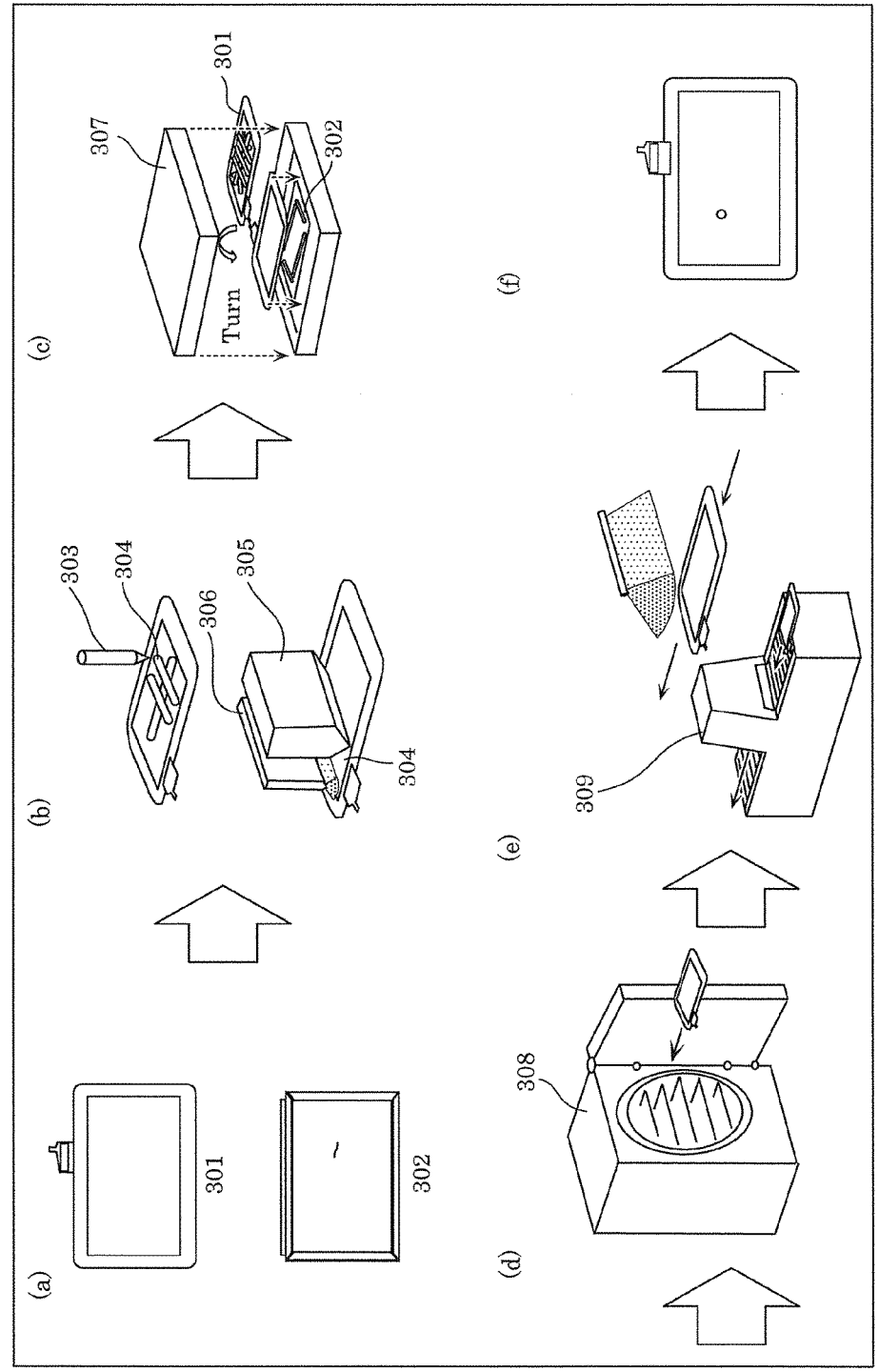
FIG. 5 is a schematic view illustrating an example of a process of vacuum bonding a touch panel and a liquid crystal backlight device.

The following describes a typical vacuum bonding process, with reference to FIG. 5.

FIG. 5 is a schematic view illustrating an example of a process of bonding a touch panel (or a cover glass) and a liquid crystal backlight device.

First, a first inspection step of inspecting foreign matter and checking damage on the material surface is performed for each of touch panel 301 and liquid crystal backlight device 302, as illustrated in (a) in FIG. 5.

Next, an application step of applying an adhesive onto the material to be bonded is performed, as illustrated in (b) in FIG. 5. The adhesive applied here is UV curing, thermosetting, anaerobic curing, or moisture curing resin, a gluing agent, or the like. Two typical application methods are illustrated in (b) in FIG. 5. One application method is called dam and fill that applies adhesive 304 using dispenser 303 (see the upper part in (b) in FIG. 5). The other application method is called slit coating that applies adhesive 304 using slit coater 305 and semi-cures adhesive 304 with temporary curing UV 306 immediately after the application. Each method has advantages and disadvantages. Both methods are known adhesive application methods and do not directly relate to the present disclosure, and so their detailed description is omitted.

The next step is a bonding step illustrated in (c) in FIG. 5.

The bonding step is performed in a vacuum environment, that is, in chamber 307 that can be decompressed to a vacuum state. First, touch panel 301 and liquid crystal backlight device 302 as adherends are fixed in the chamber so as to face each other, and decompression is performed to create a vacuum state in the chamber. After this, the two adherends coated with the adhesive are bonded.

Figure 6:
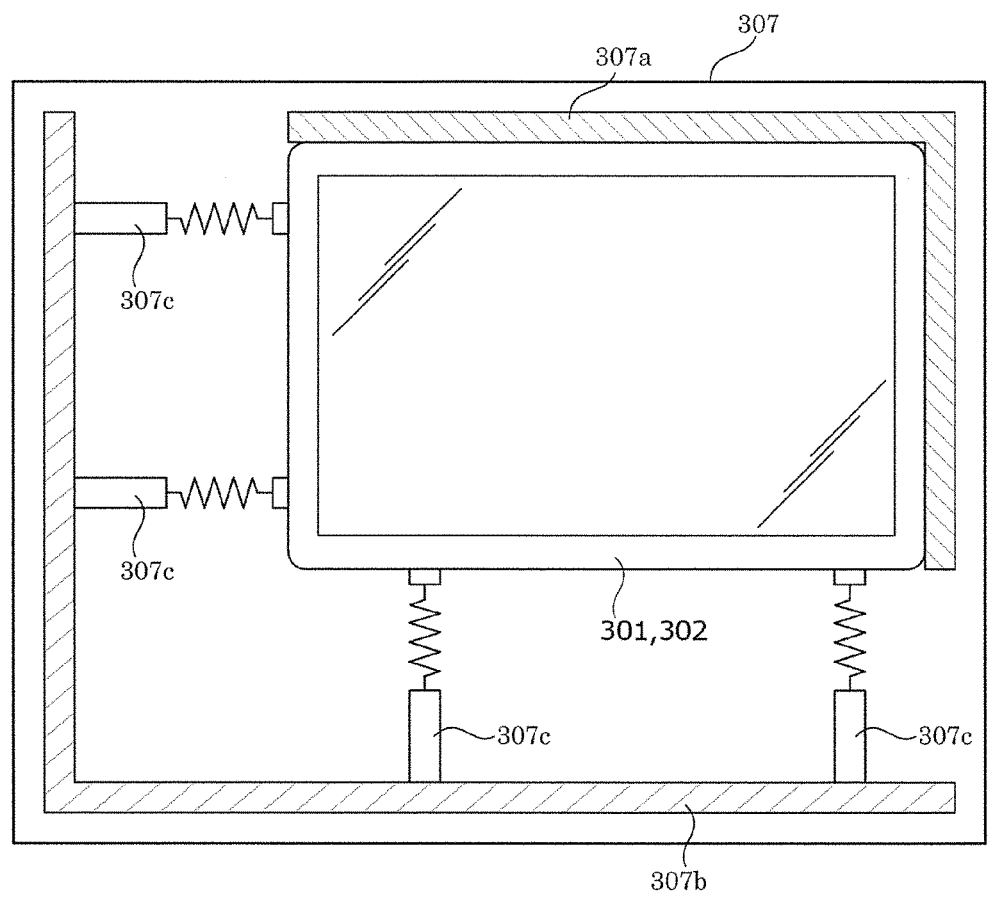
FIG. 6 is a view illustrating the internal structure of a chamber for fixing the touch panel and the liquid crystal backlight device at appropriate positions.

When fixing touch panel 301 and liquid crystal backlight device 302 in chamber 307, the two adherends (touch panel 301 and liquid crystal backlight device 302) coated with the adhesive are fixed so that they are bonded at respective appropriate positions. For example, first regulating portion 307a, second regulating portion 307b, and a plurality of holding portions 307c are arranged in chamber 307, as illustrated in FIG. 6. FIG. 6 is a view illustrating the internal structure of the chamber for fixing the touch panel and the liquid crystal backlight device at appropriate positions.

First regulating portion 307a regulates the movement of one long side and short side of each of touch panel 301 and liquid crystal backlight device 302 in a top view. First regulating portion 307a is fixed to chamber 307, and is an L-shaped wall in a top view.

Second regulating portion 307b is located opposite to first regulating portion 307a, and is an L-shaped wall. Second regulating portion 307b is fixed to chamber 307, as with first regulating portion 307a.

The plurality of holding portions 307c are located on the first regulating portion 307a side of second regulating portion 307b, and hold the other long side and short side of each of touch panel 301 and liquid crystal backlight device 302 toward first regulating portion 307a. For example, the plurality of holding portions 307c hold touch panel 301 and liquid crystal backlight device 302 toward first regulating portion 307a by a stretching force of a compression spring that has been compressed. Thus, in the bonding step, each side of each of touch panel 301 and liquid crystal backlight device 302 is held by first regulating portion 307a or holding portions 307c.

Only the lateral part of frame 120 may have the hole through which the space inside frame 120 and the outside space communicate with each other. This keeps any device for fixing the adherends during bonding from restricting airflow through the hole (holes 104d, 105c, and 106d) of frame 120.

The following methods are available in the bonding step: bringing the two adherends closer to each other and bonding them; and further pressurizing the adherends and bonding them. In both methods, bonding is performed after creating a vacuum state in the chamber. This has an effect of suppressing the entry of air bubbles during bonding. Even if air bubbles enter, they are in a vacuum state, and so disappear easily when the inside of the chamber is returned to atmospheric pressure. The structure according to the present disclosure solves the problem that arises when a vacuum state is created as mentioned above.

The next step is a pressurization step of putting, in autoclave 308, touch panel 301 and liquid crystal backlight device 302 bonded in the vacuum environment, as illustrated in (d) in FIG. 5. In the pressurization step, bonded touch panel 301 and liquid crystal backlight device 302 may be put in autoclave 308 whose inside space is in a high-pressure environment to perform only pressurization. Alternatively, heating may be further performed. This allows air bubbles that have entered in the bonding step to disperse and penetrate into the adhesive. The pressurization step may be omitted depending on the type or application method of the adhesive.

The next step is a UV irradiation step of passing bonded touch panel 301 and liquid crystal backlight device 302 through UV irradiator 309, as illustrated in (e) in FIG. 5. The UV irradiation step is performed only in the case where the adhesive is a UV curing adhesive or a gluing agent.

The next step is a second inspection step of inspecting whether or not the appearance of bonded touch panel 301 and liquid crystal backlight device 302 has any abnormality, as illustrated in (f) in FIG. 5.

The typical vacuum bonding process has been described above.

[3. Expansion Area of Liquid Crystal Backlight Device in Vacuum Bonding Process]

Figure 7:
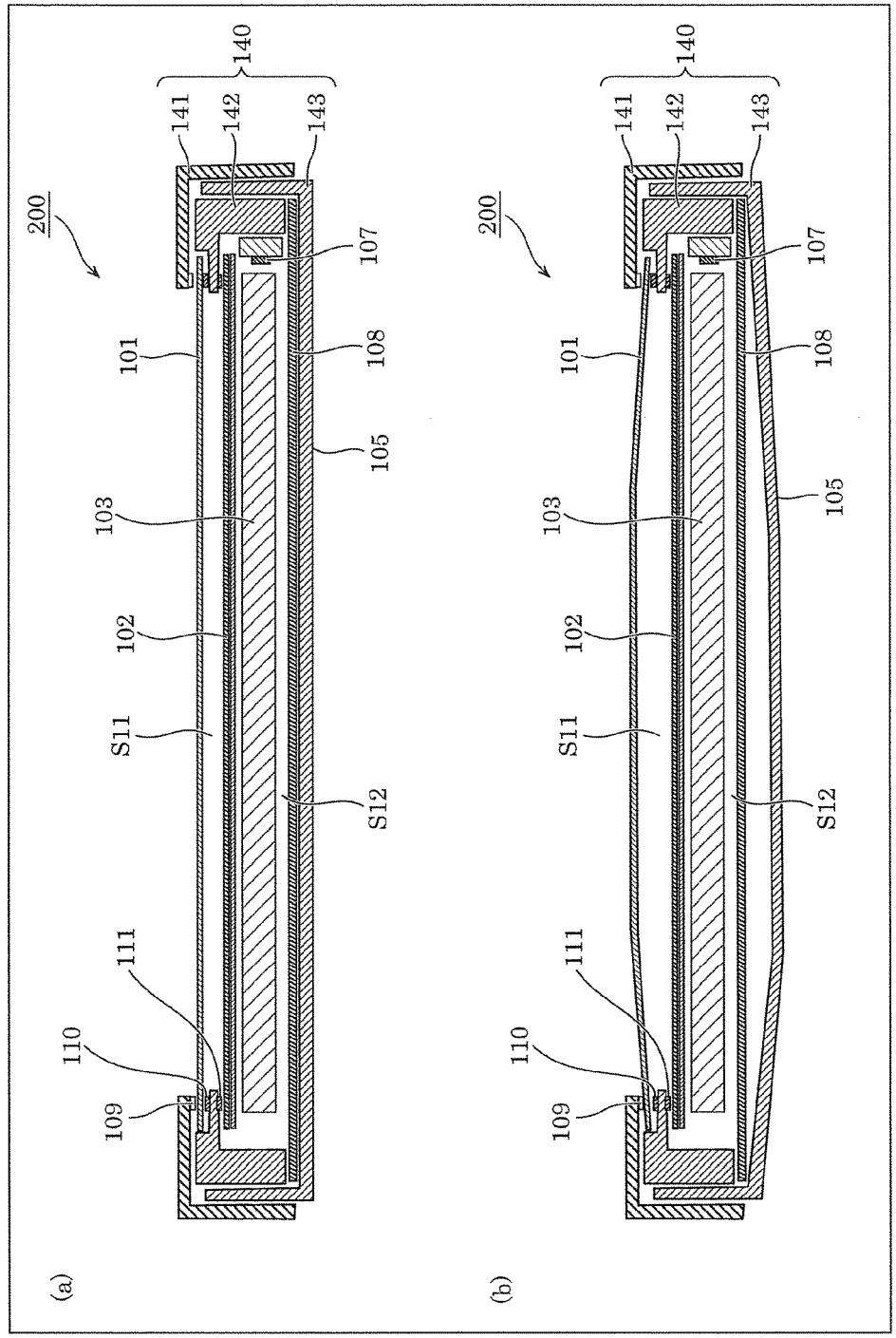
FIG. 7 is a sectional view illustrating a problem when vacuum bonding a conventional liquid crystal backlight device.

The problem of the expansion of the liquid crystal module during vacuum bonding is described in detail below, with reference to FIG. 7. FIG. 7 is a sectional view illustrating the problem when vacuum bonding a conventional liquid crystal backlight device. (a) in FIG. 7 is a schematic view illustrating the state of the liquid crystal module under atmospheric pressure (i.e. before creating a vacuum state). (b) in FIG. 7 is a schematic view illustrating the state of the liquid crystal module upon rapid decompression to a vacuum state. FIG. 7 thus illustrates the change of the conventional liquid crystal backlight device before and after decompression.

Conventional liquid crystal backlight device 200 differs from liquid crystal backlight device 100 in the structure of frame 140 and the arrangement of cushion member 111, as illustrated in FIG. 7. In detail, the lateral wall of frame 140 has no through hole, and the space defined by liquid crystal panel 101, frame 140, and cushion member 109 is hermetically sealed from the outside. The other structures are the same as those in liquid crystal backlight device 100. Frame 140 thus includes front frame 141, first frame 142, and second frame 143 having no through hole.

The space defined by liquid crystal panel 101, frame 140, and cushion member 109 is hermetically sealed from the outside. Therefore, the shape of first space S11 that is surrounded by liquid crystal panel 101 and the optical sheet and the shape of second space S12 that is surrounded by the back frame and in which light guide plate 103 and reflection sheet 108 are located change before and after decompression. Each of first space S11 and second space S12 is a separate, independent closed space inside liquid crystal backlight device 200. In other words, first space S11 and second space S12 are each a space closed from outside liquid crystal backlight device 200. A typical liquid crystal backlight device tends to have first space S11 and second space S12 as in the case of liquid crystal backlight device 200, although the size of each of first space S11 and second space S12 may differ depending on the type. In some cases, reflection sheet 108 and light guide plate 103 are partially bonded with two-sided adhesive tape or the like for fixing, in liquid crystal backlight device 200. Reflection sheet 108 and light guide plate 103 are, however, not wholly bonded together. When the outside of liquid crystal backlight device 200 is rapidly decompressed in the vacuum bonding process as an example, an air pressure difference occurs between the inside and outside of liquid crystal backlight device 200, so that first space S11 and second space S12 formed in liquid crystal backlight device 200, i.e. the space inside liquid crystal backlight device 200, expand. As a result, liquid crystal backlight device 200 is swollen as illustrated in (b) in FIG. 7. When the bonding step illustrated in (c) in FIG. 5 is performed on the touch panel and such swollen liquid crystal backlight device 200, liquid crystal backlight device 200 and the touch panel cannot be brought into surface contact with each other. Thus, the touch panel cannot be accurately placed at an appropriate position of liquid crystal backlight device 200. Here, in the case of further pressurizing the touch panel and the liquid crystal backlight device for bonding, it is difficult to apply uniform pressure to the outer surfaces of the touch panel and liquid crystal backlight device. This causes air bubbles to enter between the bonded surfaces, or the touch panel and the liquid crystal backlight device to be misaligned from their position for bonding at which they have been aligned beforehand.

The bonding step illustrated in (c) in FIG. 5 is performed in a clean room. Accordingly, in the case of bonding touch panel 130 to liquid crystal backlight device 100, seal material 113 is removed immediately before the bonding step. By removing seal material 113, the space inside frame 120 and the outside space can be easily brought into a communicating state. In this state, liquid crystal backlight device 100 and touch panel 130 are aligned, and bonded in chamber 307. After completing the bonding, the hole in the lateral part of frame 120 is sealed with seal material 113 again. The seal material used here may be the seal material attached to liquid crystal backlight device 100 before the bonding, or another seal material. The present disclosure is not limited in this context. This prevents the entry of foreign matter into liquid crystal backlight device 100, and also keeps the liquid crystal backlight device from expanding in chamber 307.

[4. Advantageous Effects]

In liquid crystal backlight device 100 according to this embodiment, cushion member 111 includes the plurality of second elastic members that surround opening 106b of first frame 106 and are arranged with predetermined spacings as openings 111a. The space defined by frame 120 is therefore not separated by optical sheet 102 and cushion member 111. This allows first space S1 between liquid crystal panel 101 and optical sheet 102 and second space S2 between optical sheet 102 and second frame 105 to communicate with each other. Moreover, the lateral part of frame 120 has the hole through which the space inside frame 120 and the outside space communicate with each other. In a state where the hole is not sealed with seal material 113, first space S1, second space S2, and the outside communicate with each other. Hence, by removing seal material 113 sealing the hole and then bonding liquid crystal backlight device 100 and touch panel 130 in a vacuum environment, the pressure difference between the space inside liquid crystal backlight device 100 and the space inside chamber 307 can be reduced.

Consequently, even in the vacuum environment, liquid crystal backlight device 100 is kept from expanding. This enables accurate and quick bonding in an aligned state. Liquid crystal backlight device 100 can thus be accurately bonded to touch panel 130 or the cover glass easily even in the case of using direct bonding.

The hole formed through frame 120 is sealed with seal material 113. Accordingly, the entry of dust from the hole into the space inside liquid crystal backlight device 100 is prevented until seal material 113 is removed in the bonding in the vacuum environment.

Embodiment 2

Figure 8:
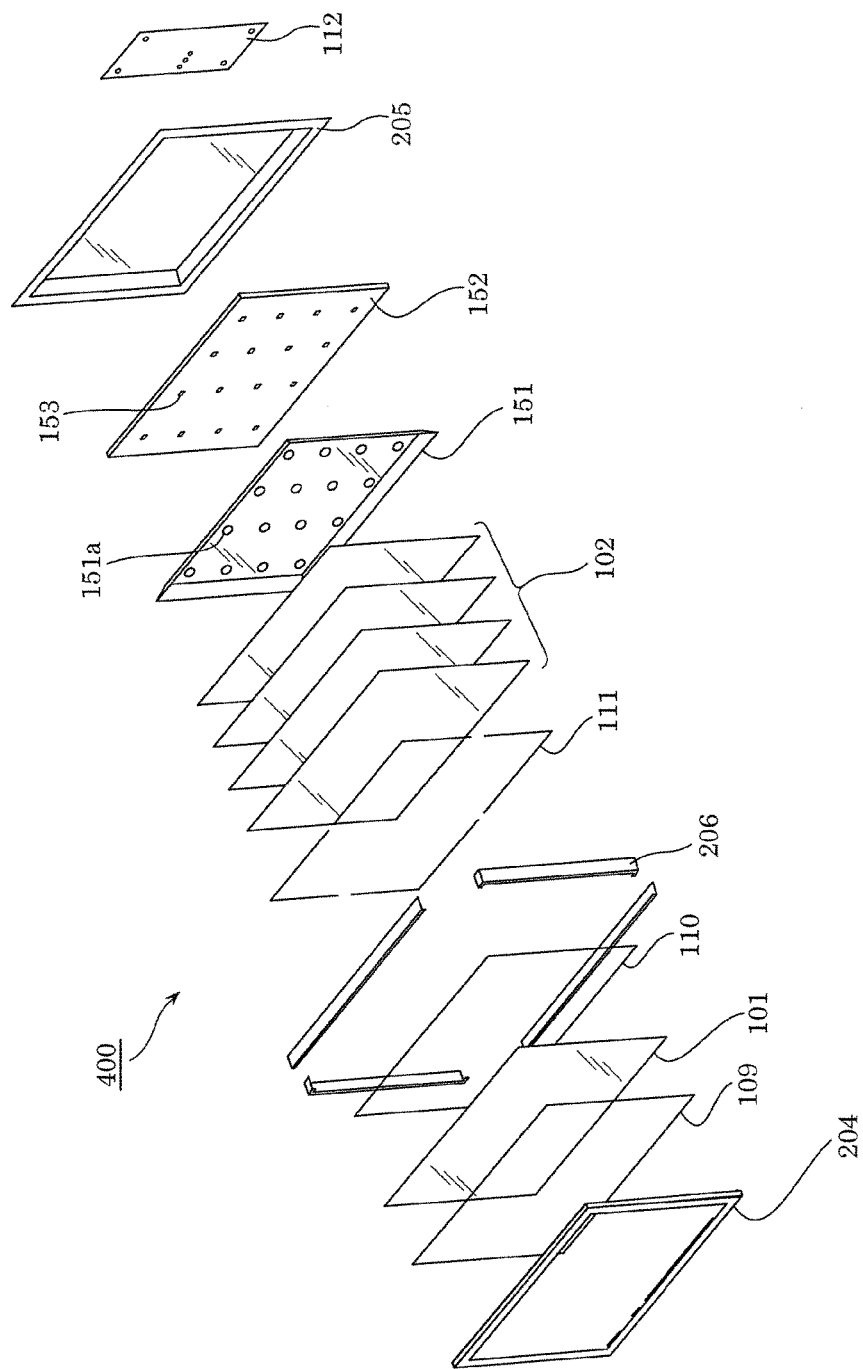
FIG. 8 is an exploded perspective view of a liquid crystal backlight device according to Embodiment 2.
Figure 9:
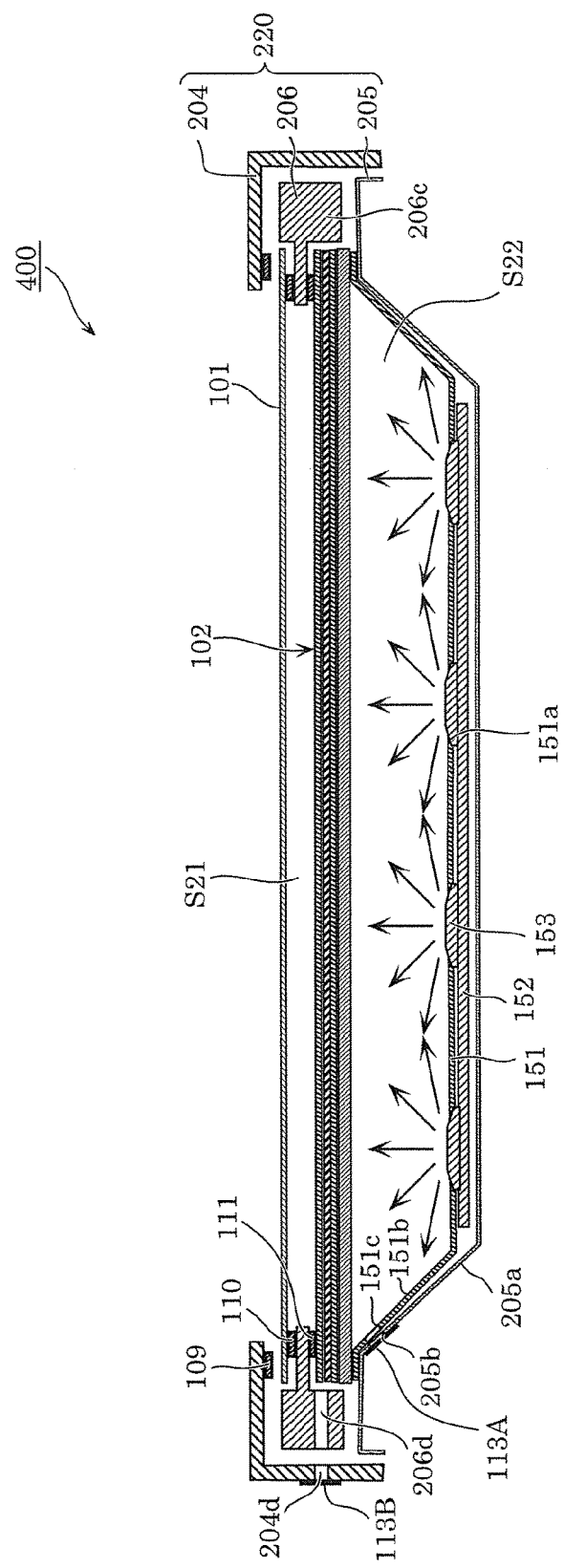
FIG. 9 is a sectional view of the liquid crystal backlight device according to Embodiment 2.

In liquid crystal backlight device 100 according to Embodiment 1, the backlight unit is an edge-lit backlight including light guide plate 103 and light source 107 located lateral to light guide plate 103. This structure is, however, not a limitation. An example is liquid crystal backlight device 400 using a direct backlight unit in which the light source is located at the back of liquid crystal panel 101 as illustrated in FIGS. 8 and 9. FIG. 8 is an exploded perspective view of a liquid crystal backlight device according to Embodiment 2. FIG. 9 is a sectional view of the liquid crystal backlight device according to Embodiment 2.

Liquid crystal backlight device 400 according to Embodiment 2 differs from liquid crystal backlight device 100 according to Embodiment 1 in that a direct backlight composed of reflection sheet 151 and light source 152 is used instead of an edge-lit backlight composed of light guide plate 103, light source 107, and reflection sheet 108 in liquid crystal backlight device 100. In addition, the shapes of front frame 204, first frame 206, and second frame 205 are different from the shapes of front frame 104, first frame 106, and second frame 105 in Embodiment 1. In particular, second frame 205 is shaped to follow inclined portion 151*b* forming the edges of reflection sheet 151. The parts of front frame 204, first frame 206, and second frame 205 that differ in shape from but have the same functions as front frame 104, first frame 106, and second frame 105 are given reference marks in the 200s instead of in the 100s, and their detailed description is omitted. The following mainly describes the differences from Embodiment 1.

Light source 152 is located at the back of liquid crystal panel 101, includes a plurality of LEDs 153 arranged in a matrix on a main surface at the front, and irradiates liquid crystal panel 101 from the back with light emitted from the plurality of LEDs. Light source 152 is located at a predetermined spacing from optical sheet 102, to diffuse the light emitted from light source 152 toward the liquid crystal panel.

Reflection sheet 151 is a sheet that is located at the front of light source 152 and reflects the light emitted from light source 152 toward the front. Reflection sheet 151 has a plurality of openings 151*a* at the positions corresponding to the plurality of LEDs 153, to expose the plurality of LEDs 153. Reflection sheet 151 has inclined portion 151*b* that reflects, at the edges of liquid crystal panel 101, the light emitted from light source 152 toward the center of liquid crystal panel 101.

Second frame 205 is shaped to follow the shape of reflection sheet 151, and includes inclined portion 205*a* that planarly supports inclined portion 151*b*. Since second frame 205 includes inclined portion 205*a*, reflection sheet 151 can maintain inclined portion 151*b* in an inclined state.

As described above, light source 152 is located at a predetermined spacing from optical sheet 102, and reflection sheet 151 and second frame 205 include inclined portions 151*b* and 205*a* respectively. Hence, second space S22 is formed between optical sheet 102 and reflection sheet 151 and light source 152 that constitute the backlight unit. Second space S22 is formed by respective inclined portions 151*b* and 205*a* of reflection sheet 151 and second frame 205 supporting optical sheet 102, and so is a closed space in the case where no hole is formed.

Meanwhile, first space S21 similar to first space S1 in Embodiment 1 is formed between liquid crystal panel 101 and optical sheet 102.

Thus, first space S21 and second space S22 are formed in liquid crystal backlight device 400 using a direct backlight, too. Accordingly, if frame 220 or the backlight unit has no hole, the same problem as that in liquid crystal backlight device 200 using an edge-lit backlight arises.

To solve this, in liquid crystal backlight device 400, holes 204*d* and 206*d* as a first hole through which first space S21 and the outside space communicate with each other are formed respectively through lateral wall portion 104*c* of front frame 204 and lateral wall portion 206*c* of first frame 206. Holes 204*d* and 206*d* as the first hole are through holes which are formed in a lateral part of first frame 206 as seen in the arrangement direction of first frame 206 and second frame 205 and through which first space S21 between liquid crystal panel 101 and the optical sheet and the outside space communicate with each other.

Moreover, holes 151*c* and 205*b* as a second hole through which second space S22 and the outside space communicate with each other are formed respectively through respective inclined portions 151*b* and 205*a* of reflection sheet 151 and second frame 205. Holes 151*c* and 205*b* as the second hole are through holes which are formed in lateral parts (inclined portions 151*b* and 205*a*) of the backlight unit and second frame 205 and through which second space S22 between the backlight unit and optical sheet 102 and the outside space communicate with each other.

Liquid crystal backlight device 400 includes seal material 113B that seals holes 204*d* and 206*d* as the first hole, and seal material 113A that seals holes 151*c* and 205*b* as the second hole.

Thus, liquid crystal backlight device 400 using a direct backlight unit has the same structure of frame 120 as that in liquid crystal backlight device 100 according to Embodiment 1, and so has the same advantageous effects as liquid crystal backlight device 100.

Other Embodiments

Although seal material 113 is made of adhesive tape in Embodiment 1, seal material 113 is not limited to adhesive tape, and may be a cap that is pressed into a hole to seal the hole. Alternatively, seal material 113 may be a bolt that is screwed into a threaded hole to seal the hole.

Although only some exemplary embodiments of the present disclosure have been described in detail above, those skilled in the art will readily appreciate that many modifications are possible in the exemplary embodiments without materially departing from the novel teachings and advantages of the present disclosure. Accordingly, all such modifications are intended to be included within the scope of the present disclosure.

What is claimed is:

1. A liquid crystal backlight device comprising:
   a frame that includes a first frame having an opening and a second frame defining a space with the first frame;
   a liquid crystal panel that is located on a side of the first frame opposite to the second frame, and covers the opening;
   a backlight unit that is located in the space, and irradiates the liquid crystal panel with light;
   an optical sheet that is located between the first frame and the backlight unit;
   a first elastic member that is located between the liquid crystal panel and the first frame, and surrounds the opening of the first frame without any gap;
   a plurality of second elastic members that are located between the first frame and the optical sheet, surround the opening of the first frame, and are arranged at a predetermined spacing from each other; and
   a seal material that seals a hole which is formed through a lateral part of the frame as seen in an arrangement direction of the first frame and the second frame and through which the space and an outside of the liquid crystal backlight device communicate with each other, wherein the seal material includes adhesive tape.

2. The liquid crystal backlight device according to claim 1, wherein the seal material blocks out light in the hole between the outside and the space.

3. The liquid crystal backlight device according to claim 1,
wherein the backlight unit includes:
a light source located in an edge region of the space; and
a light guide plate that guides light emitted from the light source, toward the liquid crystal panel and the optical sheet, and
the hole is formed through the lateral part of the frame, on a side opposite to a side on which the light source is located.

4. The liquid crystal backlight device according to claim 1, wherein only the lateral part of the frame has the hole.

5. The liquid crystal backlight device according to claim 1, wherein the hole is larger than a gap between the frame and the liquid crystal panel, the gap being situated between the space and the outside.

6. A liquid crystal backlight device comprising:
a frame that includes a first frame having an opening and a second frame defining a space with the first frame;
a liquid crystal panel that is located on a side of the first frame opposite to the second frame, and covers the opening;
a backlight unit that is located in the space, and irradiates the liquid crystal panel with light;
an optical sheet that is located between the first frame and the backlight unit;
a first elastic member that is located between the liquid crystal panel and the first frame, and surrounds the opening of the first frame without any gap;
a plurality of second elastic members that are located between the first frame and the optical sheet, surround the opening of the first frame, and are arranged at a predetermined spacing from each other; and
a seal material that seals a first hole and a second hole, the first hole being a hole which is formed through a lateral part of the first frame as seen in an arrangement direction of the first frame and the second frame and through which a first space between the liquid crystal panel and the optical sheet and a space outside the liquid crystal backlight device communicate with each other, and the second hole being a hole which is formed through a lateral part of the backlight unit and the second frame as seen in the arrangement direction and through which a second space between the backlight unit and the optical sheet and the outside space communicate with each other,
wherein the seal material includes adhesive tape.

7. A liquid crystal backlight device comprising:
a frame that includes a first frame having an opening and a second frame defining a space with the first frame;
a liquid crystal panel that is located on a side of the first frame opposite to the second frame, and covers the opening;
a backlight unit that is located in the space, and irradiates the liquid crystal panel with light;
an optical sheet that is located between the first frame and the backlight unit;
a first elastic member that is located between the liquid crystal panel and the first frame, and surrounds the opening of the first frame without any gap;
a plurality of second elastic members that are located between the first frame and the optical sheet, surround the opening of the first frame, and are arranged at a predetermined spacing from each other; and
a seal material that seals a hole which is formed through the backlight unit and the second frame and through which the space and an outside of the liquid crystal backlight device communicate with each other, wherein
the seal material includes adhesive tape.

\* \* \* \* \*